US006638836B1

(12) United States Patent
Murari et al.

(10) Patent No.: US 6,638,836 B1
(45) Date of Patent: Oct. 28, 2003

(54) PROCESS FOR MANUFACTURING A GROUP COMPRISING AT LEAST TWO ELEMENTS, ONE WHEREOF INCLUDES AN ENCAPSULATED MICRO-INTEGRATED STRUCTURE, AND THEREBY OBTAINED GROUP

(75) Inventors: Bruno Murari, Monza (IT); Benedetto Vigna, Pietrapertosa (IT); Simone Sassolini, Sansepolcro (IT); Francesco Ratti, Alessandria (IT); Alberto Alessandri, Vazia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 335 days.

(21) Appl. No.: 09/727,608

(22) Filed: Nov. 30, 2000

(30) Foreign Application Priority Data

Feb. 2, 2000 (EP) .............................. 00830075

(51) Int. Cl.[7] .............................. H01L 21/30

(52) U.S. Cl. .................. 438/459; 438/458; 438/455; 257/723

(58) Field of Search ................ 438/459, 455, 438/460, 458; 257/723

(56) References Cited

U.S. PATENT DOCUMENTS

| | | | |
|---|---|---|---|
| 4,943,750 A | 7/1990 | Howe et al. ............. | 310/309 |
| 5,025,346 A | 6/1991 | Tang et al. ............. | 361/283 |
| 5,521,778 A | 5/1996 | Boutaghou et al. ........ | 360/106 |
| 5,539,596 A | 7/1996 | Fontana et al. ........... | 360/106 |
| 5,805,375 A | 9/1998 | Fan et al. ............. | 360/78.12 |
| 5,920,441 A | 7/1999 | Cunningham et al. ... | 360/78.05 |
| 5,959,808 A | 9/1999 | Fan et al. ............. | 360/106 |
| 6,483,671 B2 * | 11/2002 | Vigna et al. ........... | 360/294.5 |
| 6,521,513 B1 * | 2/2003 | Lebens et al. ........... | 438/462 |

FOREIGN PATENT DOCUMENTS

EP 913921 A1 5/1999

OTHER PUBLICATIONS

"Preamp Chip on Actuator Arm Boosts Signal Margin", Data Storage, Feb. 18, 1998.
Woods, D., "Preamp on the load beam delivers more performance", Data Storage, Jun. 21–23, 1999.
Zhang, L, et al., "Lost Data: How a Little Dirt Can Do a Lot of Damage", Data Storage, Mar. 15–20, 1999.
Imamura, T. et al., "Transverse Mode Electrostatic Micoactuator For MEMS–Based HDD Slider", Proceedings of the Annual International Workshop on Micro Electro Mechanical Systems, IEEE, Workshop 9:216–221, Feb. 11, 1996.
Fan, L.S. et al., "Magnetic Recording Head Positioning at Very High Track Densities Using a Microactuator–Based Two Stage Servo System", IEEE Transactions on Industrial Electronics, 42(3):222–233, Jun. 1, 1995.

(List continued on next page.)

*Primary Examiner*—Richard Elms
*Assistant Examiner*—Brad Smith
(74) *Attorney, Agent, or Firm*—Lisa K. Jorgenson; Robert Iannucci; Seed IP Law Group PLLC

(57) ABSTRACT

The manufacture process includes: forming a first wafer of semiconductor material housing integrated electronic components forming a microactuator control circuit and a signal preamplification circuit; forming microactuators, each including a rotor and a stator, in a surface portion of a second wafer of semiconductor material; attaching the second wafer to the first wafer, with the surface portion of the second wafer facing the first wafer; thinning the second wafer; attaching the second wafer to a third wafer to obtain a composite wafer; thinning the first wafer; cutting the composite wafer into a plurality of dice connected to a protection chip; removing the protection chip; attaching read/write transducers to the dice; and attaching the dice to supporting blocks for hard-disk drivers.

19 Claims, 13 Drawing Sheets

OTHER PUBLICATIONS

Hirano, T. et al., "Micro–Actuator for Tera–Storage", IEEE:441–446, 1999.

Lee, A.P. et al., Polysilicon Micro Vibromotors, Proceedings of the Workshop on Micro Electro Mechanical Systems, IEEE, Workshop 5:177–182, Feb. 4, 1992.

Gianchandani, Y. et al., "Batch Fabrication and Assembly of Micromotor–Driven Mechanisms with Multi–Level Linkages", Proceedings of the Workshop on Micro Electro Mechanical Systems, IEEE, Workshop 5:141–146, Feb. 4, 1992.

Tang, W.C. et al., "Laterally Driven Polysilicon Resonant Microstructures", Sensors and Actuators, Elsevier Sequoia, 20(½):25–32, Nov. 15, 1989.

* cited by examiner

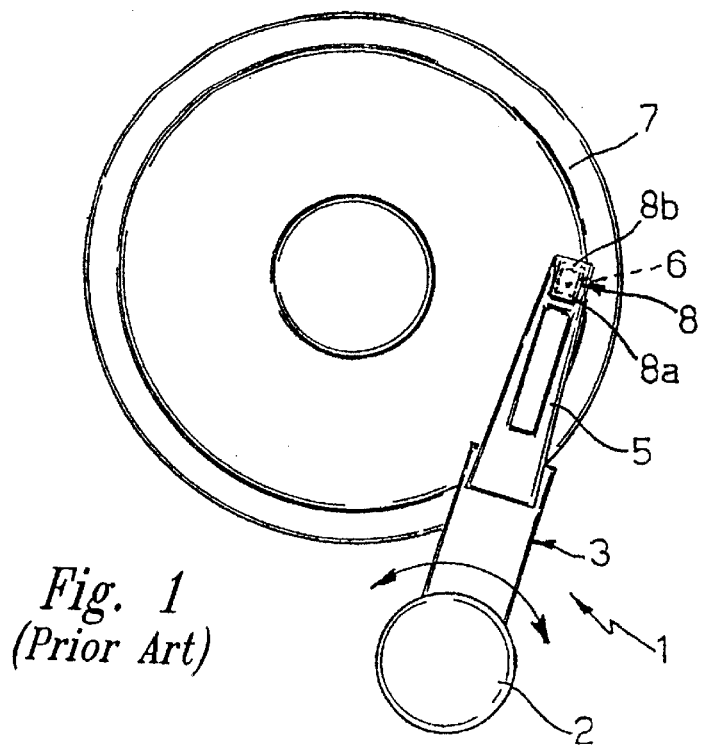
Fig. 1
*(Prior Art)*
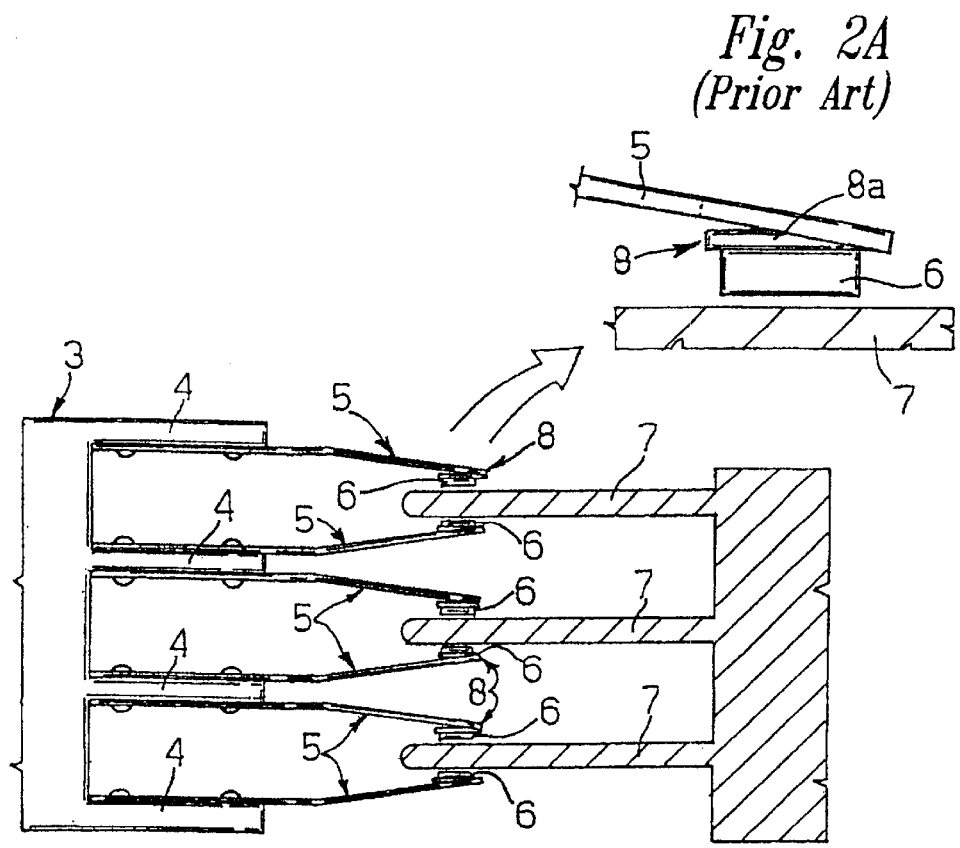
Fig. 2A
*(Prior Art)*
Fig. 2
*(Prior Art)*

PROCESS FOR MANUFACTURING A GROUP COMPRISING AT LEAST TWO ELEMENTS, ONE WHEREOF INCLUDES AN ENCAPSULATED MICRO-INTEGRATED STRUCTURE, AND THEREBY OBTAINED GROUP

TECHNICAL FIELD

The present invention regards a process for manufacturing a group comprising at least two elements, one whereof includes an encapsulated micro-integrated structure, and a thereby obtained group. In particular, the invention may be advantageously applied for assembling a microactuator, an integrated device including microactuator control circuitry and a head in a hard-disk read/write unit with double micrometric actuation.

BACKGROUND OF THE INVENTION

As is known, hard disks are the most widely used data-storage medium; consequently, they are produced in very large volumes, and the maximum data-storage density increases from one year to the next. Hard disks are read and written by actuator devices, the general structure of which is shown in FIGS. 1 and 2 and is described hereinafter.

In particular, FIG. 1 shows a known actuator device 1 of the rotary type comprising a motor 2 (also called "voice coil motor") fixed to a support body, generally called "E-block" because of its E-like shape in side view (see FIG. 2). The support body 3 has a plurality of arms 4, each of which carries a suspension 5 including a cantilevered lamina. At its end not fixed to the support body 3, each suspension 5 carries a R/W transducer 6 for reading/writing, arranged (in an operative condition) facing a surface of a hard disk 7 so as to perform roll and pitch movements and to follow the surface of the hard disk 7. To this end, the R/W transducer 6 (also referred to as slider) is fixed to a joint, called gimbal or flexure 8, generally formed from the suspension 5 and comprising, for example, a rectangular plate 8a cut on three and a half sides starting from the lamina of the suspension 5, and having a portion 8b connected to the suspension 5 and allowing flexure of the plate 8a under the weight of the slider 6 (see FIG. 2A)

In order to increase the data storage density, it has already been proposed to use a double actuation stage, with a first, rougher actuation stage including the motor 2 moving the assembly formed by the support body 3, the suspension 5 and the R/W slider 6 through the hard disk 7 during a coarse search for the track, and a second actuation stage performing a finer control of position of the slider 6 during tracking. According to a known solution, the second actuation stage comprises a microactuator 10 arranged between the gimbal 8 and the slider 6, as may be seen in FIG. 3, which shows, in exploded view, the end of the suspension 5, the gimbal 8, the slider 6, and the microactuator 10, in this case, of the rotary type. The microactuator 10 is controlled by a signal supplied by control electronics on the basis of a tracking error.

At present, the circuit for pre-amplificating the signal picked up by the slider 6 is arranged on the board, or at most on the end of the support body 3, while the microactuator controlling circuitry is integrated with the microactuator. This integration is made possible by silicon microprocessing techniques, such as epitaxial microprocessing or metal electroplating.

The above-mentioned technologies make it difficult, if not impossible, to obtain a group comprising the microactuator-controlling circuitry, the microactuator, the slider, and the pre-amplifying circuit on a same wafer.

In case of epitaxial microprocessing, there is a dimensional incompatibility between the microactuator and the pre-amplification circuit. This incompatibility is due to the fact that the minimum photolithographic dimension of the microactuator is of the order of 1 μm; instead, because of the high operating frequencies, the pre-amplification circuit requires an extreme photolithographic process not exceeding 0.35 μm. The difference between the minimum photolithographic dimensions thus renders integration of the two devices on the same technological platform not very convenient The metal electroplating technique makes it possible to obtain mechanical structures on the circuitry, but presents certain drawbacks. In fact, it is not possible to effectively protect the micromechanical structures from contamination caused by particles present in the hard-disk driver; assembly of the slider on the microactuator proves difficult; in addition, electrical isolation of the signals supplied by the head from the signals controlling the microactuator is difficult.

SUMMARY OF THE INVENTION

An embodiment of the present invention is a process for assembling a micromechanical structure, in particular a microactuator, on a supporting element, in particular an integrated device containing the circuitry, that protects the micromechanical structure at least during assembly.

BRIEF DESCRIPTION OF THE DRAWINGS

For a clear understanding of the present invention, a preferred embodiment is now described, simply as a non-limiting example, with reference to the attached drawings, wherein:

FIG. 1 is a top view of a hard disk actuator of known type;

FIG. 2 is an enlarged side view of some parts of the actuator of FIG. 1;

FIG. 2A is a further enlarged view of some parts of FIG. 2;

DETAILED DESCRIPTION OF THE INVENTION

Figure 3:
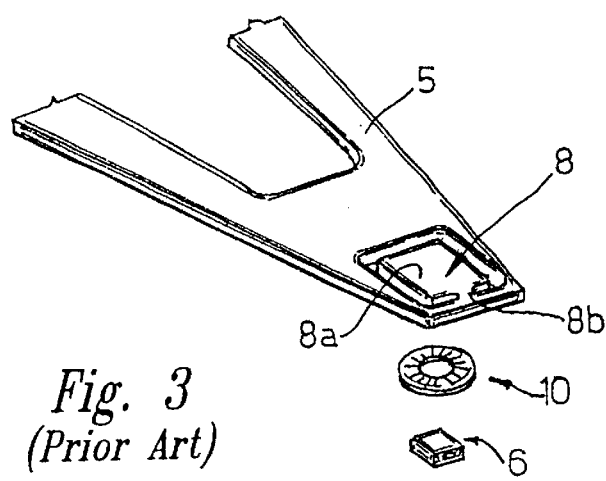
FIG. 3 is an exploded view of the micrometric actuation unit in an actuator device equipped with double actuation stage.

In the following description, reference will be made to the process for assembling a wafer, integrating encapsulated-type microactuators, on a wafer containing circuits for controlling the microactuator and signal-preamplification circuits, as well as for assembling the dice, obtained after cutting, on respective sliders and suspensions 5. In practice, with reference to FIG. 3, and as will be explained more clearly hereinbelow, the die containing a microactuator-controlling circuit and a signal-preamplification circuit is arranged between the microactuator 10 and the flexure 8.

Figure 4:
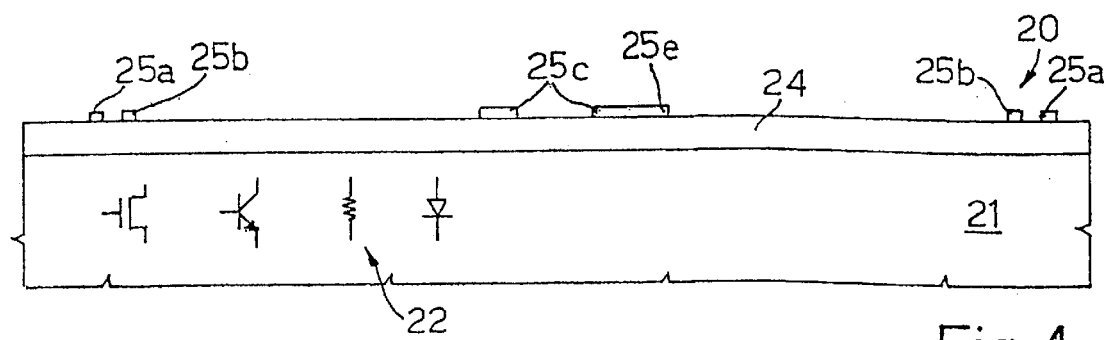
FIGS. 4 and 5 show cross-sections through two starting wafers used in a process according to the invention.
Figure 11:
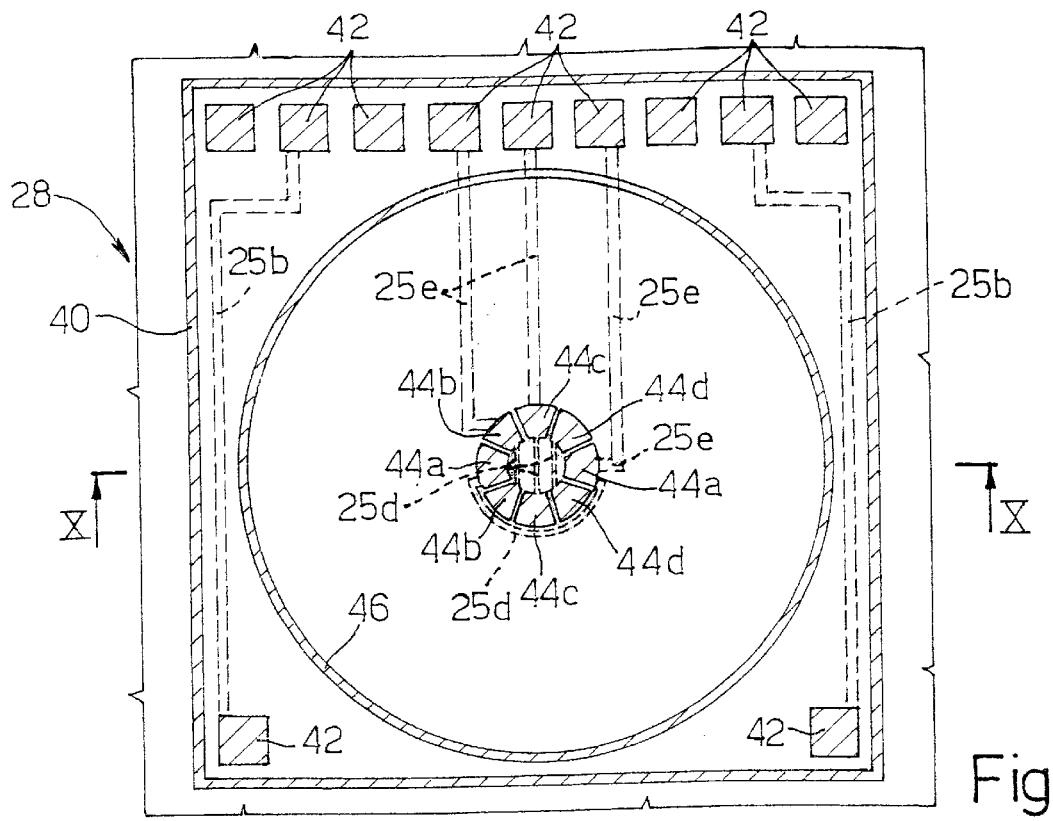
FIG. 11 shows a top view of the wafer of FIG. 10, in the same scale as figure 6.
Figure 18:
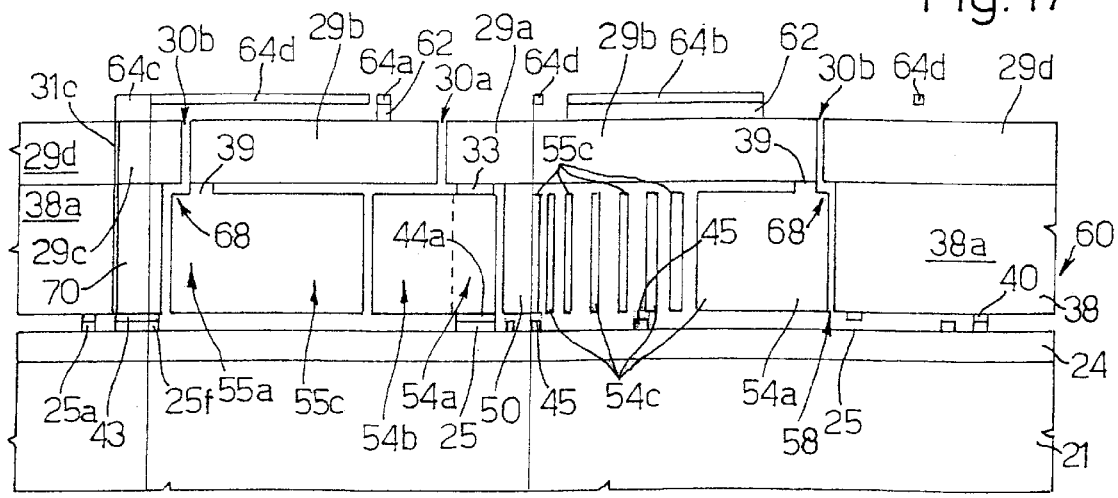
FIG. 18 shows a cross-section of the composite wafer in a manufacture step subsequent to FIG. 17, taken along cross-section line XVIII—XVIII of FIG. 19.

For this purpose (FIG. 4), in a first wafer 20 comprising a body 21 of monocrystalline silicon having a thickness of, for example, 600–700 $\mu$m, the circuits for controlling the microactuators and the circuits for signal preamplification 22 are formed, wherein these circuits are represented by electrical symbols of MOS and bipolar active components and passive components, using known microintegration techniques. The circuits 22 are of a standard type, and consequently they are not represented in detail. On top of the body 21, after completion of the electronic devices, an isolation layer 24, for example BPSG is formed; this layer is opened to form the connections of the circuits 22 with the microactuators 10 and the sliders 6, and, on top of the isolation layer 24 metal regions 25a–25e are formed—only some of which may be seen in FIG. 4, while others are indicated by a dashed line in FIG. 11, as will be described hereinafter—for example, of palladium or gold, for electrical connection and bonding, using standard techniques of deposition and photolithographic definition of metal material. In particular, in this step there are formed: a bottom frame region 25a (the complete shape of which coincides with that of the region designated by 40 in FIG. 11); bottom pads (only one of which, designated by 25f, may be seen in FIG. 18); first electric connection lines 25b between the bottom pads; eight bottom conductive sectors 25c (the shape of which coincides with that of the top conductive sectors 44 of FIG. 11); second electric connection lines 25d (FIG. 11) which connect the bottom conductive sectors 25c two by two; and third interconnection lines 25e between the bottom conductive sectors 25c and certain bottom pads 25f (FIG. 11 and 18).

Figure 5:
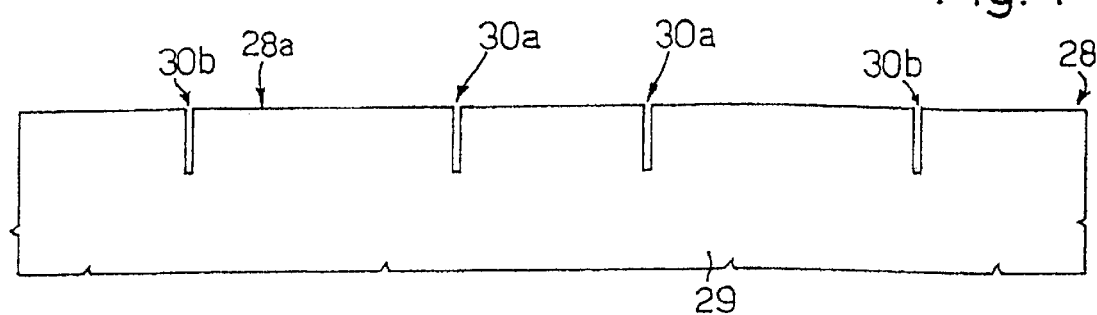

With reference to FIG. 5, a second wafer 28 is moreover formed. The second wafer 28 comprises a substrate 29 of monocrystalline silicon having a thickness of, for example, 600–700 $\mu$m. The second wafer 28 is designed to house a plurality of adjacent microactuators 10, and FIG. 5 shows a portion of a single microactuator 10.

Figure 6:
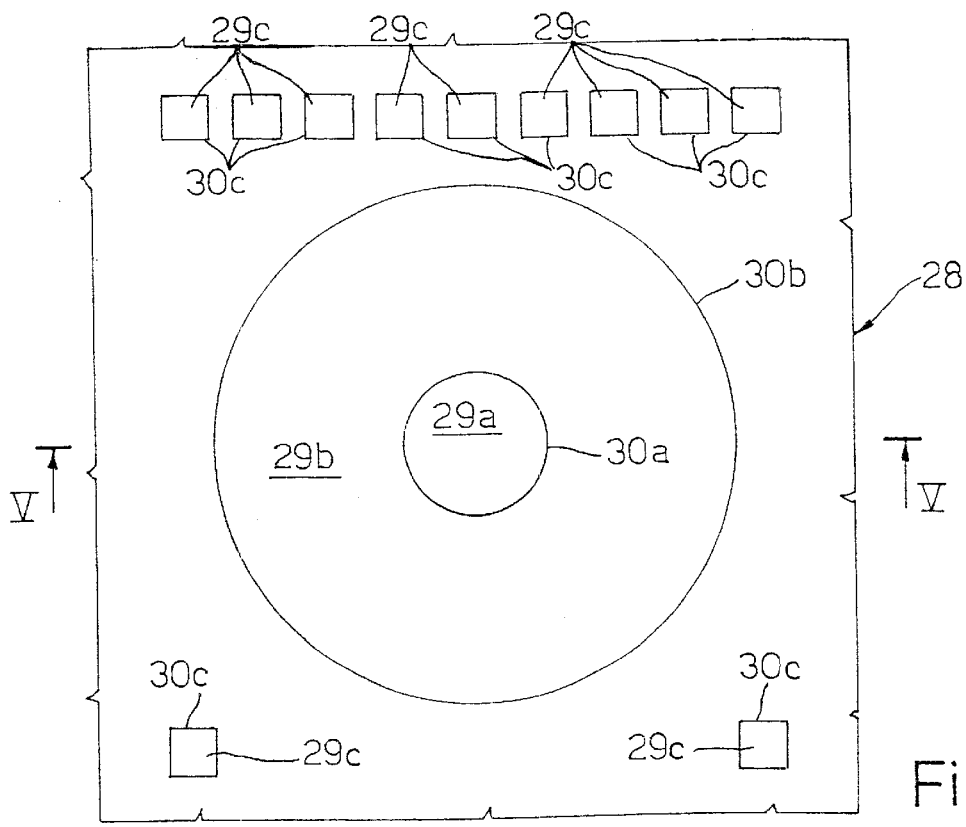
FIG. 6 shows a top view of the wafer of FIG. 5, at a slightly reduced scale.

The second wafer 28 is etched so as to form a first trench 30a, a second trench 30b, and a plurality of isolation trenches 30c having a width of approximately 1.5–2 $\mu$m and a depth of, for instance, 10 $\mu$m, the shape of which may be seen in FIG. 6. In detail, as is shown in FIGS. 5 and 6, the first trench 30a has the shape of a circle with a first diameter and externally delimits a central supporting region 29a extending next to a surface 28a of the substrate 29. The second trench 30b has the shape of a circle with a second diameter greater than the first diameter and is concentric with the first trench 30a so as to delimit, laterally, together with the first trench 30a, an annular supporting region 29b arranged next to the surface 28a of the substrate 29. The isolation trenches 30c, not visible in FIG. 5 and represented each only by a line in FIG. 6, have a square, or in general polygonal, shape, are arranged outside the second trench 30b, and delimit respective portions of the substrate 29 designed to form through electric connection regions 29c, also adjacent to the surface 28a. In particular, the isolation trenches 30c are arranged externally with respect to the second trench 30b.

The first and second trench 30a, 30b have the purpose of mechanically separating movable portions and fixed portions of the substrate 29, as will be explained more clearly later on.

Figure 7:
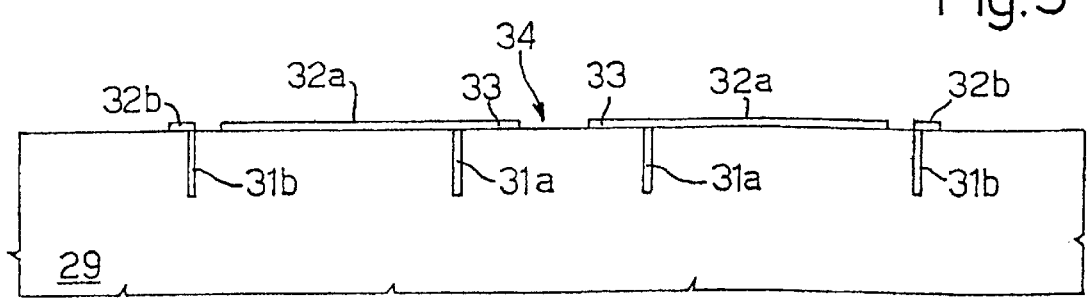
FIG. 7 shows a cross-section of the wafer of FIG. 5, in a subsequent manufacture step.
Figure 8:
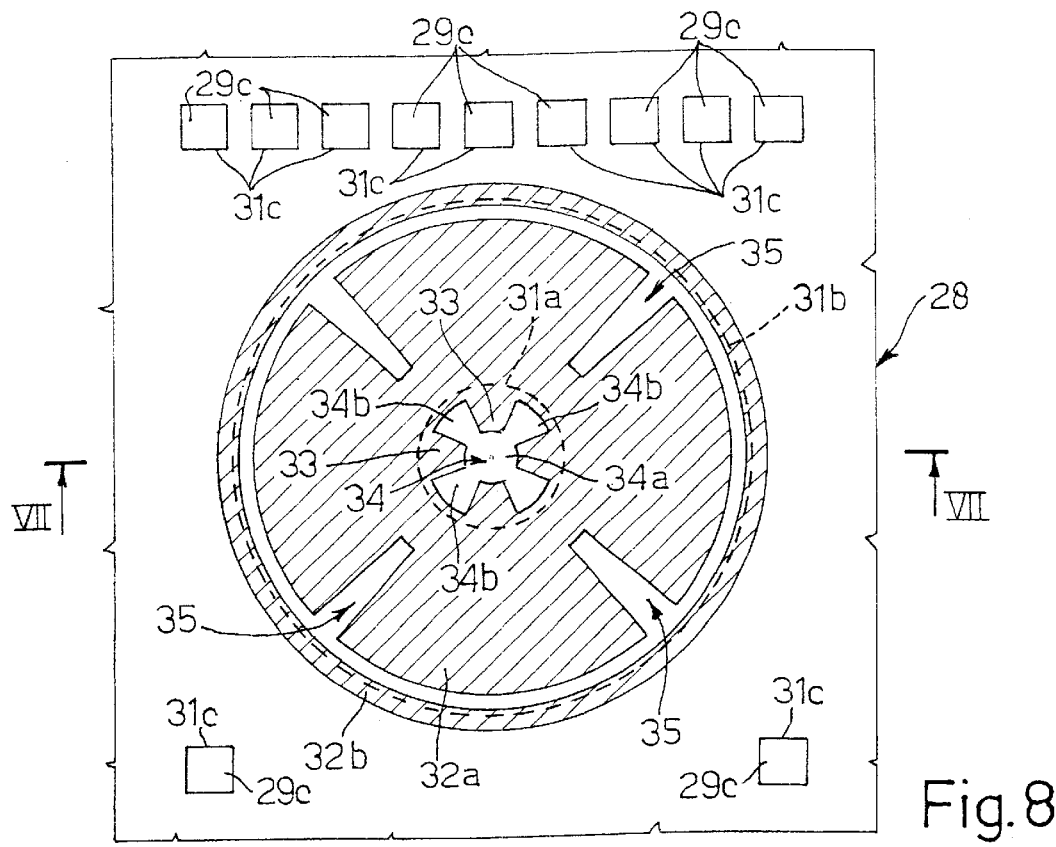
FIG. 8 shows a top view of the wafer of FIG. 7, in the same scale as FIG. 6.

Subsequently (FIG. 7), a first sacrificial layer (for example of silicon dioxide) is deposited for a thickness of approximately 1.5 $\mu$m; the sacrificial layer fills the trenches 30a, 30b, 30c, is then removed from the surface 28a of the substrate 29, and forms a first immobilization region 31a (in the first trench 30a), a second immobilization region 31b (in the second trench 30b), and deep electric isolation regions 31c (in the isolation trenches 30c), the deep isolation regions 31c being visible only in FIG. 8. Next, on the substrate 29a second sacrificial layer (for example of silicon dioxide) having a thickness of, for example, of 2 $\mu$m is deposited and defined; the second sacrificial layer forms an anchor defining region 32A and a labyrinth region 32b, the shape whereof may be seen in the top view of FIG. 8. The external area of the labyrinth region 32b remains free from oxide areas to reduce the mechanical stress induced by the oxide.

In detail, the anchor defining region 32A has a generally annular shape, delimited internally by a central opening 34 and having radial notches 35. The central opening 34 comprises a central area 34a, which is circular, and of four expansions or "fins" 34b extending radially outwards starting from the central area 34a and arranged at 90° increments with respect to each other. The fins 34a delimit between each other portions of the anchor defining region 32A, hereinafter referred to as stator insulating regions 33, which have the function of anchoring and electrically insulating a stator of the microactuator 10, as will be explained in greater detail hereinafter. The radial notches 35 extend from the outer circumference of the anchor defining region 32A towards the fins 34b and define, as the fins 34b, areas of the substrate 29 where a rotor of the microactuator 10 is to be anchored, as will be clarified hereinafter. As an alternative, the portions of the anchor defining region 32A between the notches 35 may not be continuous, but reproduce the shape of the arms of the micromotor, as explained below.

The labyrinth region 32b has an annular shape and surround at a distance the anchor defining region 32A. The labyrinth region 32b has an inner diameter equal to or smaller than the second immobilization region 31b, and an outer diameter greater than the outer diameter of the second immobilization region 31b, as may be clearly seen in FIG. 7.

Figure 9:
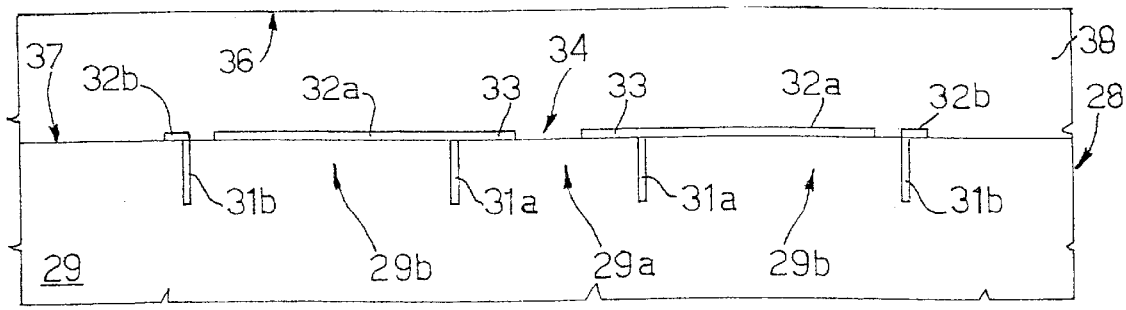
FIGS. 9 and 10 show cross-sections of the wafer of FIG. 7 in a subsequent manufacture step.

Subsequently (FIG. 9), a seed polycrystalline silicon layer is deposited (for a thickness of approximately 300–500 nm), and then a polycrystalline epitaxial layer 38 is grown, for a thickness of approximately 30 $\mu$m. The epitaxial layer 38 grows directly in contact with the substrate 29, in an area corresponding to the opening 34, the notches 35, between the anchor defining region 32A and the labyrinth region 32b, as well as outside the labyrinth region 32b itself; furthermore, it grows on top of the anchor defining region 32A and labyrinth region 2b. The epitaxial layer 38 thus has a first face 36, which is free, and a second face 37, which is facing the substrate 29 and is opposite to the first face 36.

Next, a polishing treatment is carried out, using the CMP technique, to reduce the roughness of the epitaxial layer 38.

Figure 10:
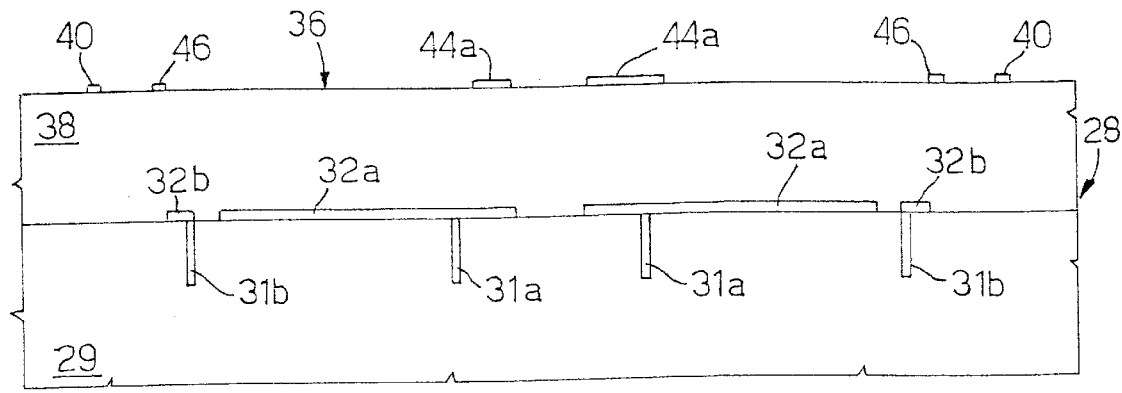

Subsequently (FIGS. 10 and 11), on the first face 36 of the epitaxial layer 38 an electrical connection and bonding material layer, for example, palladium, is deposited and defined so as to form: an upper frame region 40, surrounding, in top view (FIG. 11), the area where the microactuator is to be formed and, as has already been said, having the same shape as the bottom frame region 25a; first top pads 42 which are vertically aligned with respective through electric connection regions 29c and may be superimposed on first bottom pads 25f (FIG. 18); four pairs of top conductive sectors 44a, 44b, 44c, 44d, which may be superimposed on the bottom conductive sectors 25c and are vertically aligned with the fins 34b and with the stator insulating regions 33 (namely, the pairs of top conductive sectors 44a and 44c are aligned with the stator insulating regions 33, and the pairs of top conductive sectors 44b and 44d are aligned with the fins 34b); and finally, a ring-shaped region 46, which has a greater diameter than the second immobilization region 31b and is arranged internally to the top frame region 40.

Figure 12A:
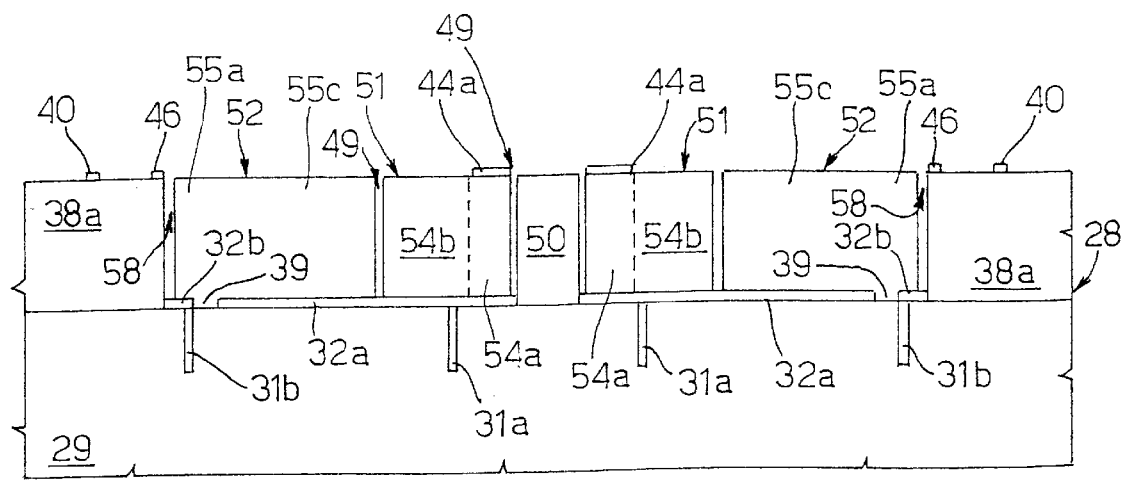
FIG. 12a shows a cross-section of the wafer of FIG. 10, in a subsequent manufacture step, taken along line A—A of FIG. 13.
Figure 12B:
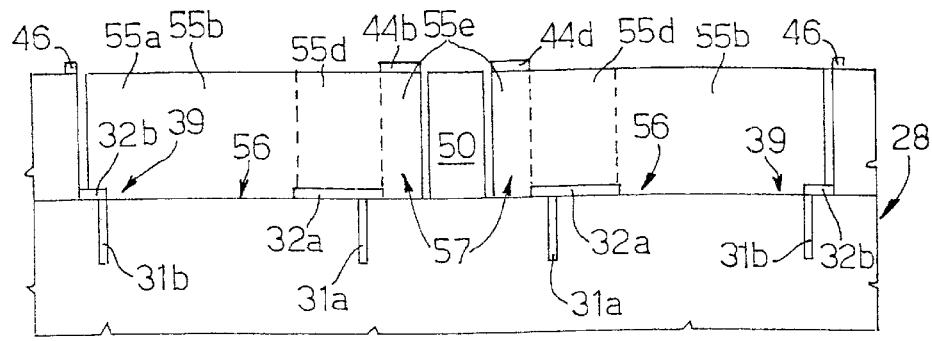
FIG. 12b shows a cross-section of the wafer of FIG. 10, taken along line B—B of FIG. 13.

The epitaxial layer 38 is deep etched using the Reactive Ion Etching (RIE) technique, the etching stopping on the anchor defining region 32A and on the labyrinth region 32b. In this phase, as is shown in the sections of FIGS. 12A and 12B (the latter figure being taken at an angle of 45° with respect to the former figure) and in the (simplified) top view of FIG. 13, third trenches 49 are formed that delimit and separate a cylindrical region 50, a stator 51, and a rotor 52 from one another, and a fourth trench 58 which laterally separates the rotor 52 from an outer portion 38a of the epitaxial layer 38. In addition, third through contact regions 70 are formed which are aligned with the through electric connection region 29c.

In particular, the cylindrical region 50 is concentric with and electrically connected to the central supporting region 29a.

Figure 13:
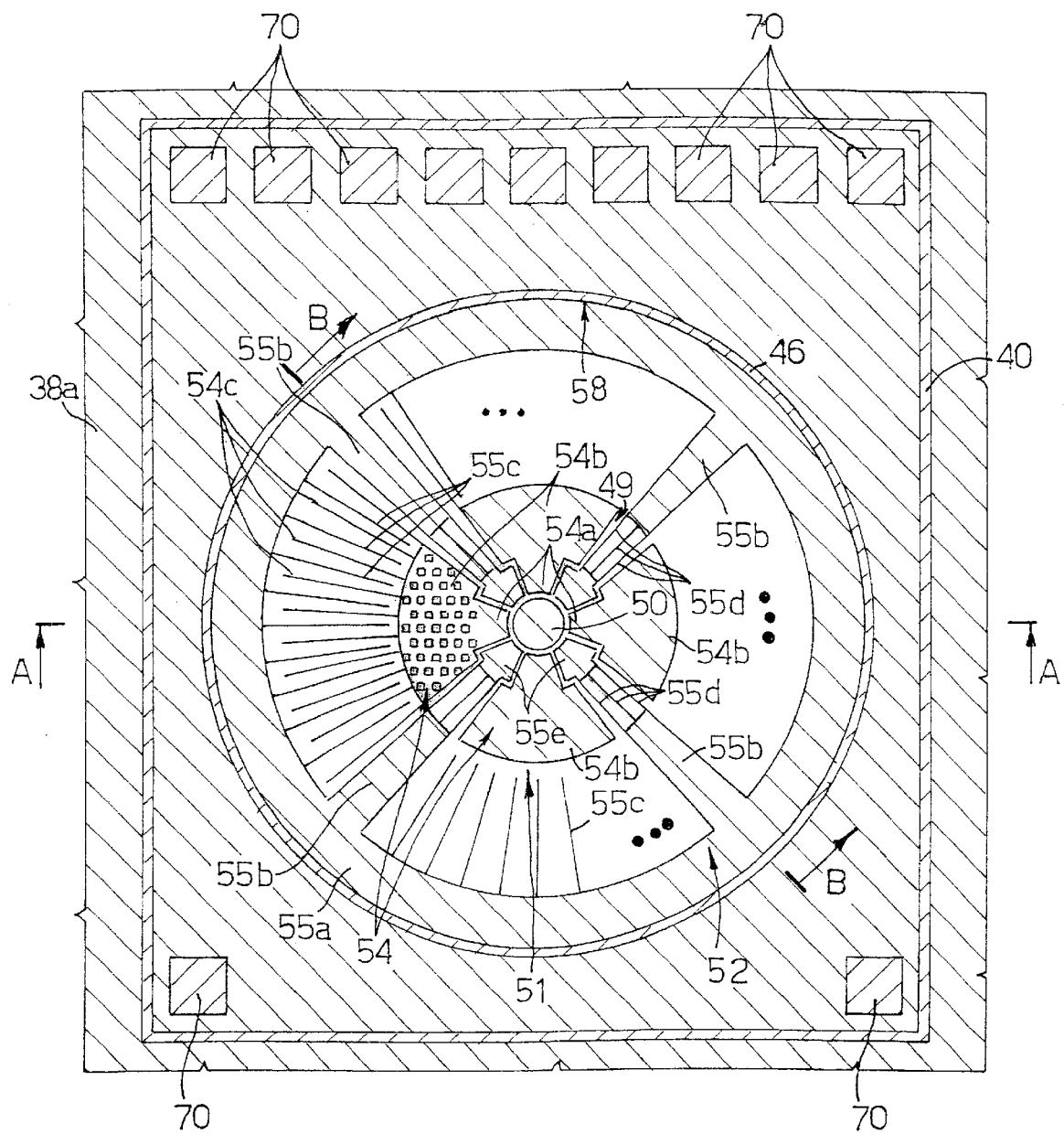
FIG. 13 shows a top view of the wafer of FIGS. 12A and 12B.

The stator 51 comprises four stator regions 54, only one of which is shown completely and schematically in FIG. 13. Each stator region 54 is completely insulated from the substrate 29 by the anchor defining region 32A, and comprises a stator anchoring portion 54a, having a substantially trapezoidal shape and extending underneath one of the top conductive sectors 44a and 44c; an annular sector portion 54b, which is provided with holes and is contiguous with and radially external to the stator anchoring portion 54a; and a plurality of fixed arms 54c extending radially outwards from the annular sector portion 54b.

The rotor 52 comprises an outer annular region 55a, having an external diameter slightly greater than the diameter of the second immobilization region 31b and separated from the external portion 38a of the epitaxial layer 38 by the fourth trench 58, which has a greater diameter and thus is not aligned to the second trench 30b; four supporting arms 55b, formed in areas corresponding to the notches 35, between pairs of adjacent stator regions 54; a plurality of movable arms 55c (FIG. 12A) extending radially inwards from the outer annular region 55a and alternated with the fixed arms 54c; spring elements 55d extending from the supporting arms 55b inwards between adjacent pairs of annular sector portions 55b; and four movable anchoring sectors 55e having a substantially trapezoidal shape, each of which extends between a pair of stator anchoring portions 54a, beneath the top conductive sectors 44b, 44d. The outer annular region 55a is in direct contact with the annular supporting regions 29b via first rotor anchoring portions 39. The supporting arms 55b are in contact with the annular supporting region 29b via second rotor anchoring portions 56 (FIG. 12B). The movable arms 55c can be formed directly on top of and in contact with the annular supporting region 29b, or else, as shown in the illustrated embodiment, may be separated from the annular supporting region 29b by portions of the anchor defining region 32A. The spring elements 55d are isolated with respect to the substrate 29 by the anchor defining region 32A (FIG. 12B), and the movable anchoring sectors 55e are in direct electrical contact with the central supporting region 29a through third rotor anchoring regions 57 formed in areas corresponding to the fins 34b (FIG. 8). In addition, the spring elements 55d have a thin cross-section if compared to the supporting arms 55b, so as to have the necessary elasticity during movement of the rotor 52. In particular, the spring elements 55d are rigid in the vertical direction (perpendicular to the microactuator plane) and are compliant to rotation.

Figure 14:
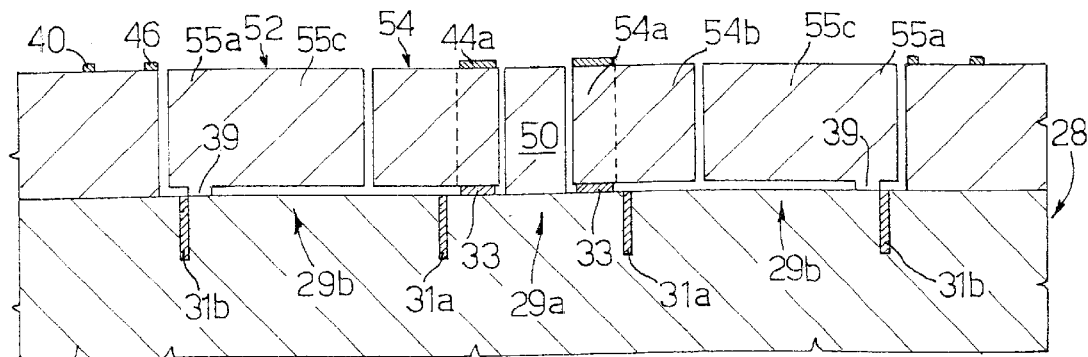
FIG. 14 shows a cross-section of the wafer of FIG. 12A, in a subsequent manufacture step.

Next (FIG. 14), the sacrificial oxide is etched using hydrofluoric-acid (HF) for a time sufficient for removing the labyrinth region 32b and the anchor defining region 32A beneath the fixed arms 54c, the movable arms 55c, and the annular sector portions 55b (thanks to the presence of holes in the latter), with the exception of the stator insulating regions 33. Consequently, the stator regions 54 remain anchored to the central supporting region 29a of the substrate 29 only at the stator insulating regions 33, and the rotor 52 remains anchored to the annular supporting region 29b of the substrate 29 at the first rotor anchoring portions 39 and the second rotor anchoring portions 56, and to the central supporting region 29a (through the spring elements 55d), at the third rotor anchoring portions 57.

Figure 15:
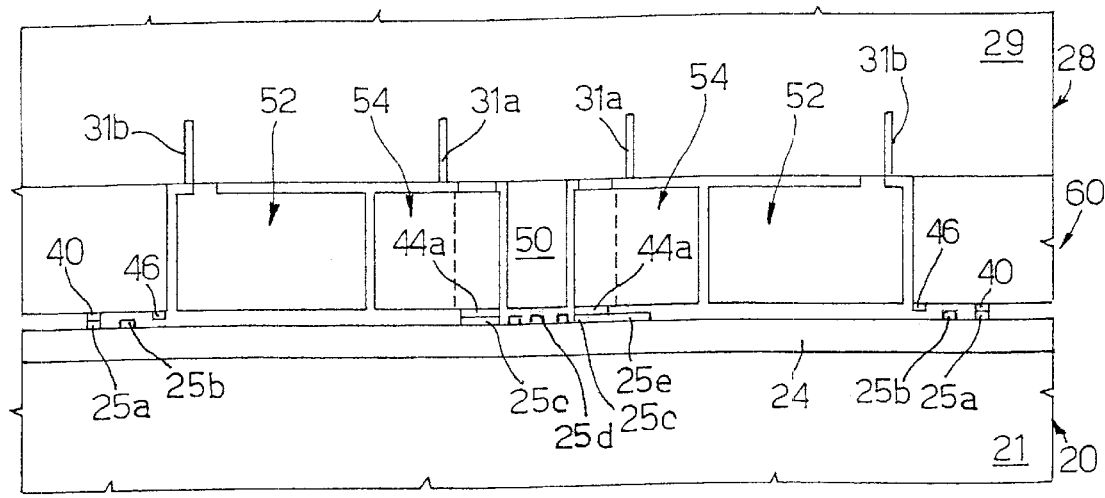
FIG. 15 shows a cross-section of the wafer of FIG. 14, after bonding to the wafer of FIG. 4.

Subsequently (FIG. 15), the second wafer 28 is turned upside down, aligned and welded to the first wafer 20 (wherein the microactuator-control and signal-preamplification circuits 22 are formed). In this phase, all the metal connection lines present on the first wafer 20 are exploited. In particular, the bottom frame region 25a are welded to the top frame region 40; the first bottom pads 25*f*, 25*a* are welded to the top pads 42; and the bottom conductive sectors 25*c*, 25*a* are welded to the top conductive sectors 44*a*–44*d*. A double wafer 60 is thus obtained.

Figure 16:
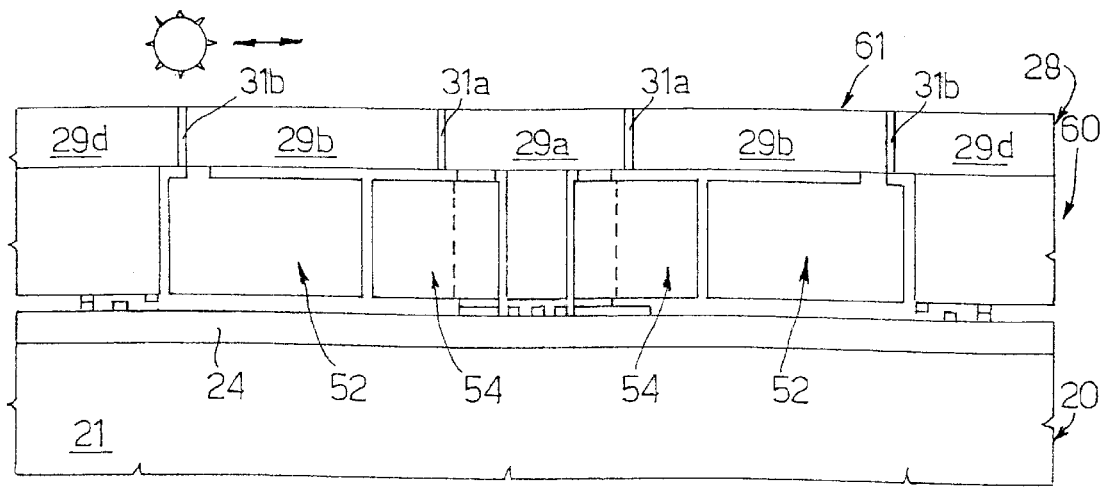
FIGS. 16 and 17 show cross-sections of the composite wafer of FIG. 15, in subsequent manufacture steps.

The second wafer 28 is then lapped (lapping phase—FIG. 16) until a final depth is obtained equal to the immobilization regions 31*a*, 31*b* (approximately 10 µm). Consequently, the second wafer 28 now has a free surface 61 where the immobilization regions 31*a*, 31*b* end. Furthermore, the central supporting region 29*a*, annular supporting region 29*b* and through electric connection regions 29*c* (the latter not being visible in FIG. 16) are now isolated from each other and from the outer portion 29*d* of the second wafer 28.

Figure 17:
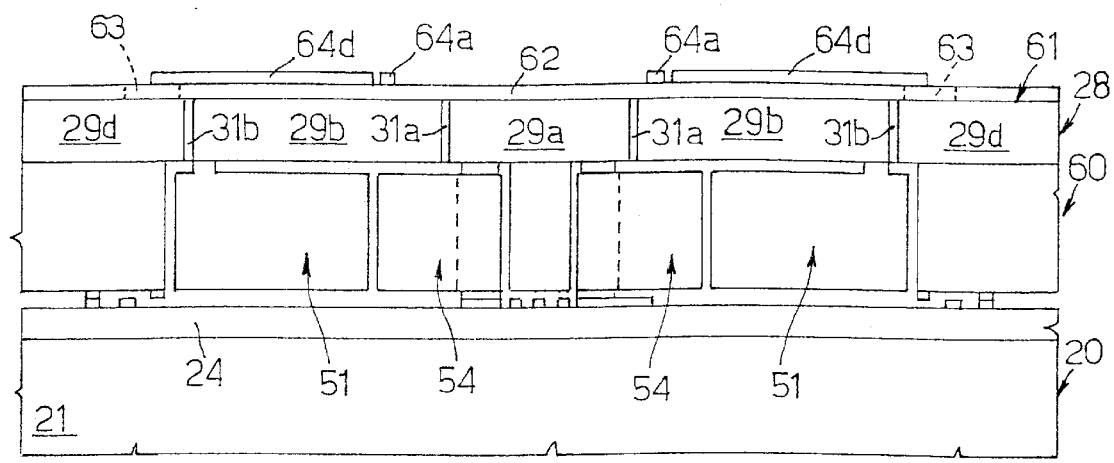

Subsequently (FIG. 17), a silicon-dioxide layer 62 with a thickness of approximately 2–3 µm is deposited on the surface 61. Vias 63 are formed through the silicon-oxide layer 62 aligned with the through electric connection regions 29*c*, as shown by dashed lines in FIG. 17. Using a resist mask (not shown), metal contact regions with a thickness of approximately 5 µm are grown galvanically (see FIG. 19), for example made of nickel (approximately 4 µm) coated with gold (for a thickness of approximately 1 µm). In detail, the following regions are formed: an annular metal region 64*a* extending on the annular supporting region 29*b*; four head connection regions 64*b* arranged at 90° to each other, externally to the annular metal region 64*a* and separate from each other; second contact pads 64*c* aligned vertically with the first top pads 42 (as may be noted from a comparison between FIGS. 19 and 11); and four electric connection lines 64*d* connecting the head connection regions 64*d* to as many second contact pads 64*c*. The second contact pads 64*c* extend also in the vias 63, thus guaranteeing electrical contact with the through electric connection regions 29*c*, as is shown only in part in FIG. 18.

Figure 19:
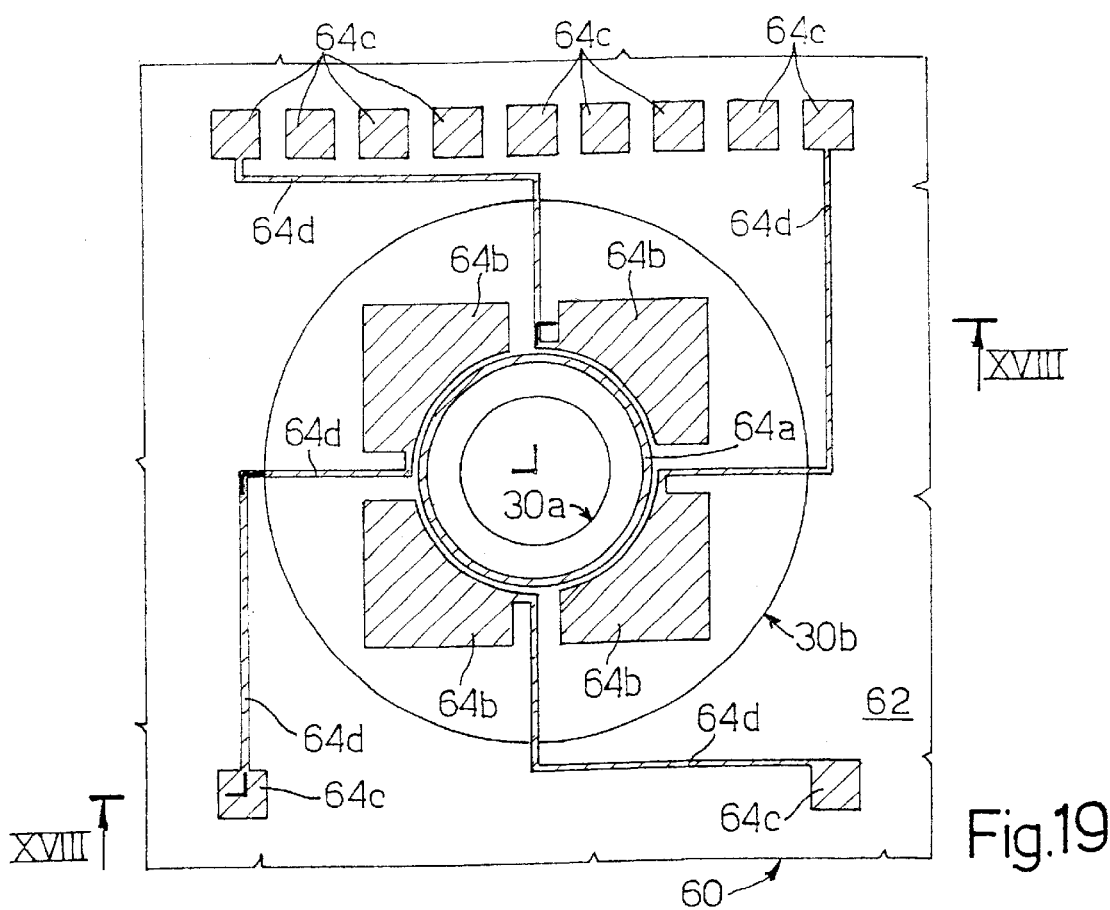
FIG. 19 shows a top view of the composite wafer of FIG. 18, in the same scale as FIG. 6.

The silicon-dioxide layer 62 is then etched without a mask and removed everywhere, except where it is shielded by the annular metal region 64*a* and by the four head-connection regions 64*b*. By appropriately selecting the width of the electric connection lines 64*d* and the etching time, the silicon-dioxide layer 62 is not, instead, shielded by the electric connection lines 64*d* (which thus remain free). In this phase, also the oxide present in the immobilization regions 31*a*, 31*b* is etched, so freeing the first trench 30*a* and the second trench 30*b*. The structure shown in FIG. 18 is thus obtained, in which, for a more complete representation of the three-dimensional structure of the double wafer 60, the section line is not straight but is as shown in FIG. 19.

In particular, FIG. 18 on the left shows, aligned with each other: a first bottom pad 25*f*, a first top pad 43, a second through connection region 70 formed in the outer portion 38*a* of the epitaxial layer 38, a through electric connection region 29*c* formed in the substrate 29, and a second contact pad 64*c* a portion whereof is formed where previously a via 63 was present. FIG. 18, on the right, shows the portion of the silicondioxide layer 62 remaining underneath a head-connection region 64*b*, fixed arms 54*c* and movable arms 55*c*. Furthermore, FIG. 18 shows the labyrinth structure comprising the second trench 30*b* and the fourth trench 58, mutually disaligned and connected together by a labyrinth path 68, where the labyrinth region 32*b* has been removed.

Figure 20:
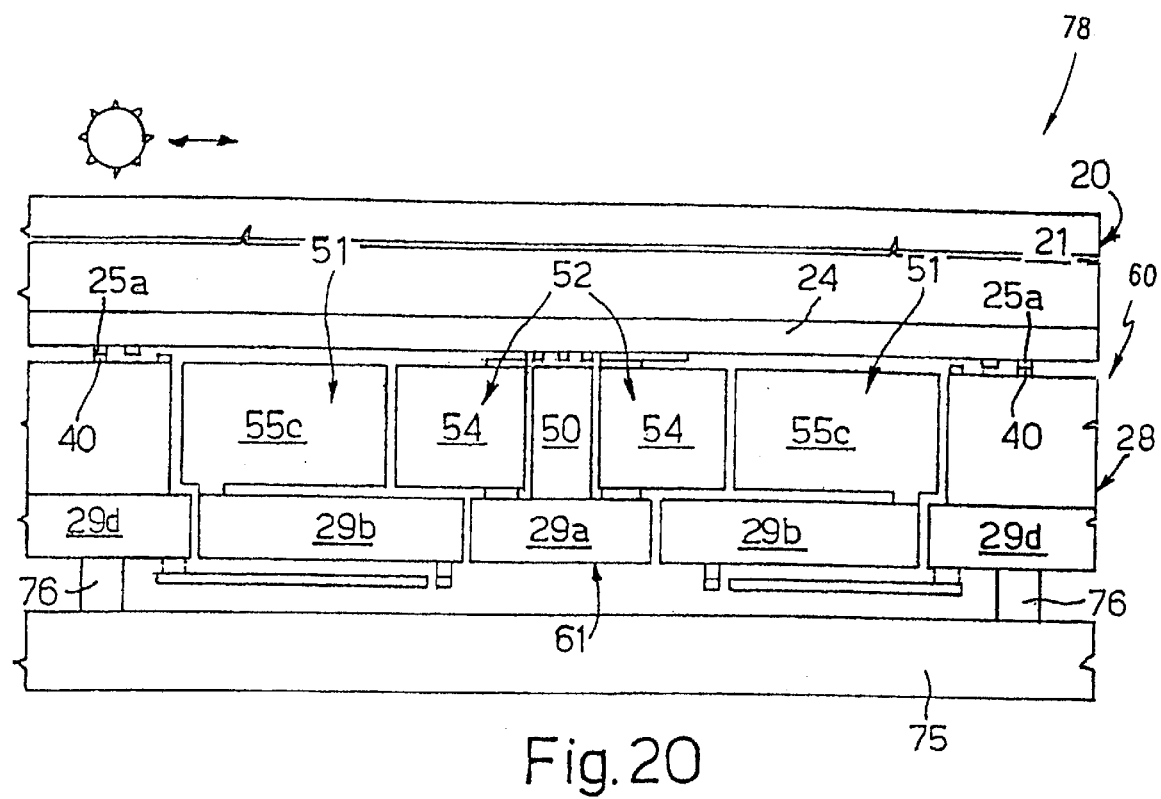
FIG. 20 shows a cross-section of the wafer of FIG. 17, after bonding to a third wafer.
Figure 26A:
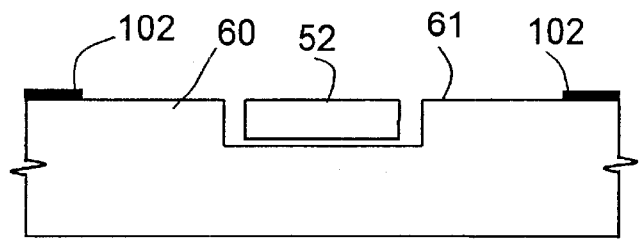
FIGS. 26a–26b show a simplified cross-section of the third wafer of FIG. 20 and of the wafer of FIG. 17 before bonding.
Figure 26B:
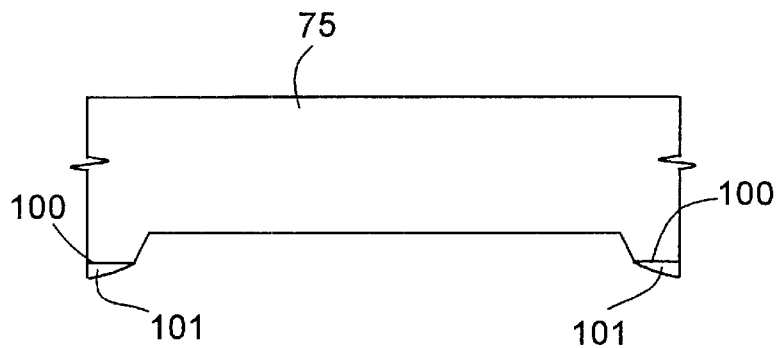

Next (FIG. 20), the double wafer 60 is glued to a third wafer 75 with the free surface 61 (where the contact metal regions 64*a*–64*d* are formed) facing the third wafer 75; in this way, a composite wafer 78 is obtained. The third wafer 75 has a service function and is made, for example, of glass or silicon. For the bonding operation, adhesive rings 76 are made on the face of the third wafer 75 facing the double wafer 60. The adhesive rings 76 form closed lines, each surrounding an area of the second wafer 28 where a respective microactuator is formed, and are of a material enabling subsequent separation of the third wafer 75 from the double wafer 60. For example, an indium or lead-tin layer may be deposited by sputtering or screen printing and then defined. Alternatively, on the free surface 61 a double layer of chromium-gold 102 (approximately 500 Å of chromium and 1 µm of gold) may be deposited (FIG. 26A) whereas on the face of the third wafer 75 facing the double wafer 60 a nickel layer 100 (approximately 2000 Å) may be deposited by sputtering and then a lead-tin layer 101 (approximately 3 µm) may be grown on the nickel layer 100 by electrodeposition (FIG. 26B).

Figure 27:
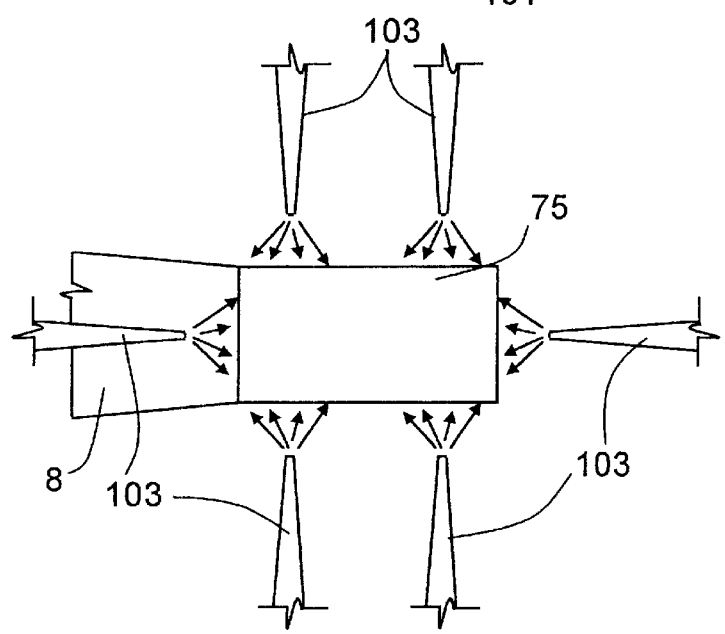
FIG. 27 shows a top view of the third wafer of FIG. 20, during a separation phase from the wafer of FIG. 17.
Figure 28:
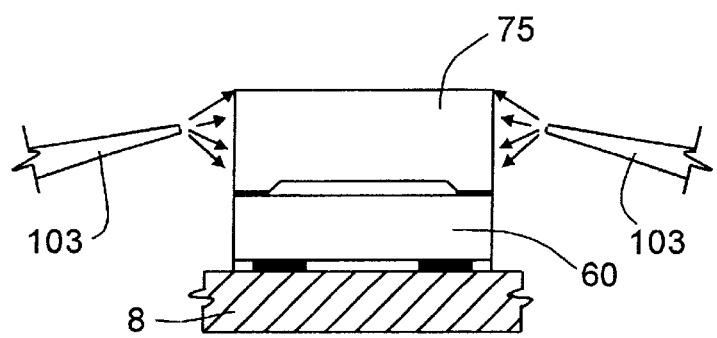
FIG. 28 shows a cross-section of the third wafer of FIG. 20, during a separation phase from the wafer of FIG. 17.

Advantageously, the separation of the third wafer 75 from the double wafer 60 can be carried out by using hot air jets 103 arranged in front of the four sides of the third wafer 75, as shown in FIG. 27, so as to heat only the periphery (110) of the third wafer 75 and not the double wafer 60. The direction of the hot jet airs 103 (FIG. 28) is such as to easily remove the third wafer 75. In particular, there is no need to have a temperature control of the third wafer 75, because, as soon as the lead-tin portion is enough melted, the third wafer 75 is pushed out naturally by the pressure of the hot air jets 103. Moreover, as the third wafer 75 has a higher temperature than the double wafer 60, the main volume of the lead-tin portion remains on the periphery (110) of the third wafer 75, attracted by the higher temperature of the latter. Furthermore, as the air pressure generates a very small extracting force, the lead-tin portion is not "bracken", but it is well melted when the third wafer 75 is separated from the double wafer 60, making the remaining lead-tin portion on the double wafer 60 periphery a smooth reflowed shape, without particles.

Figure 29:
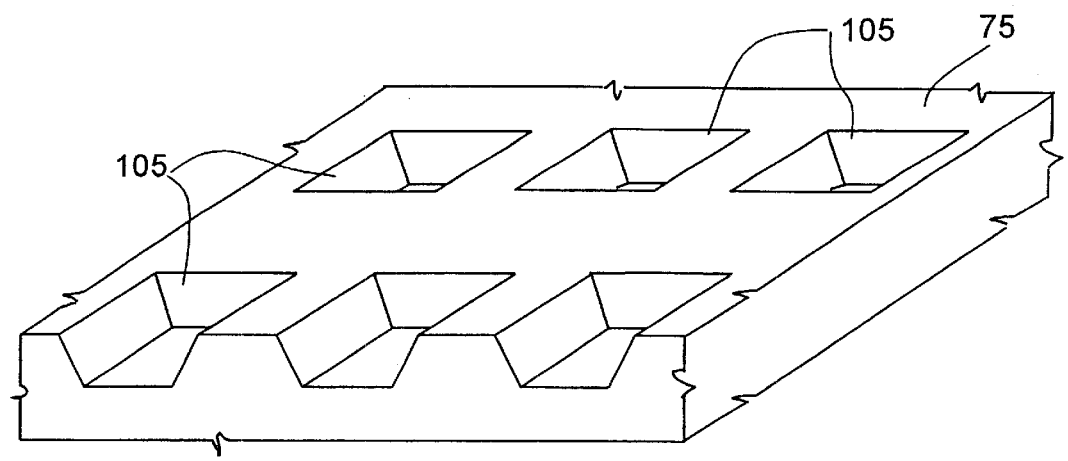
FIG. 29 shows a perspective view of a different embodiment of the third wafer of FIG. 20.
Figure 30:
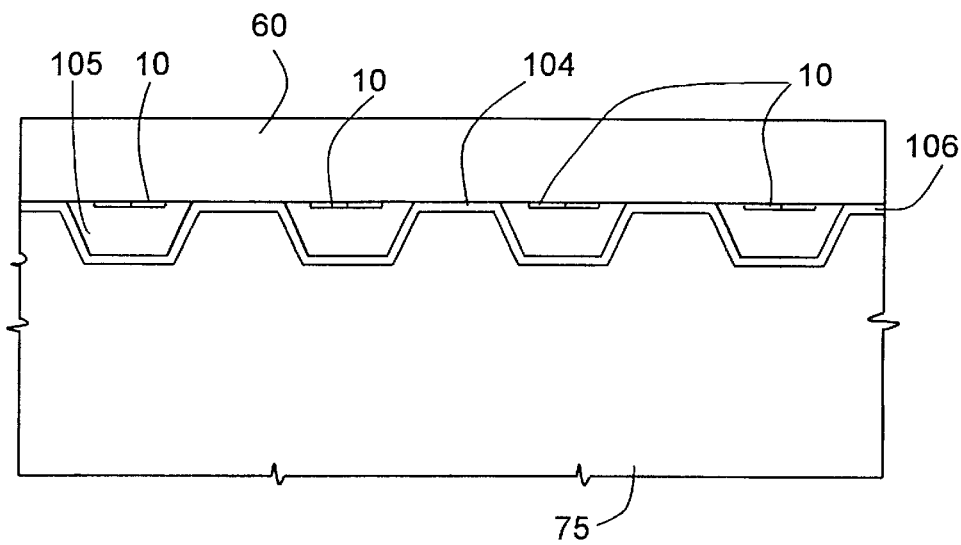
FIG. 30 shows a cross-section of the wafer of FIG. 17, after bonding to the wafer of FIG. 29.

Moreover, as shown in FIGS. 29–30, if the third wafer 75 has protruding portions 104, just the gluing material may be deposited. More specifically, as shown in FIG. 29, the protruding portions 104 define in the third wafer 75 a plurality of cavities 105, each having square shape and cross-section of substantially trapezoidal form. After the bonding operation, each cavity 105 houses a respective microactuator 10 (FIG. 30) which is free to do little motions in air. If the third wafer 75 is made of silicon, cavities 105 are formed carrying out an anisotropic dry etching (for example, in plasma of sulfur hexafluoride) or an anisotropic wet etching (for example, TMAH). For the bonding operation, a gel 106 is deposited on the protruding portions 104 and on the cavities 105. As regards the gel 106, a DGL™ TM film is commonly used for Silicon, GaAs, and InP wafer thinning applications. The film is mounted to the front side surface of the wafer to prevent breakage and provides a superior back side surface finish. The GEL's unique elastomeric properties uniformly distributed the grinding and lapping loads. For special bumped or inked wafer thinning applications, the thicker 17 mil GEL-PAK film securely holds the wafer and assures no damage to bumps and/or transfer of bump pattern to the wafer back side. The WF film can be held directly to a porous vacuum chuck or mounted to a standard fixture using wax. Placing the film between the wafer front side and wax eliminates the need for costly solvent cleaning steps and reduces wafer breakage.

As well, the gel 106 should be fluidtight and releasable to enable subsequent separation of the third wafer 75 from the double wafer 60.

Thus, the microactuator 10 is completely isolated from the outside world, since it is enclosed between the first wafer 20, the third wafer 75, the frame regions 25a, 40, and the adhesive rings 76 or the respective cavity 105.

The first wafer 20 is then lapped until it has a thickness of approximately 80–100 μm.

Figure 21:
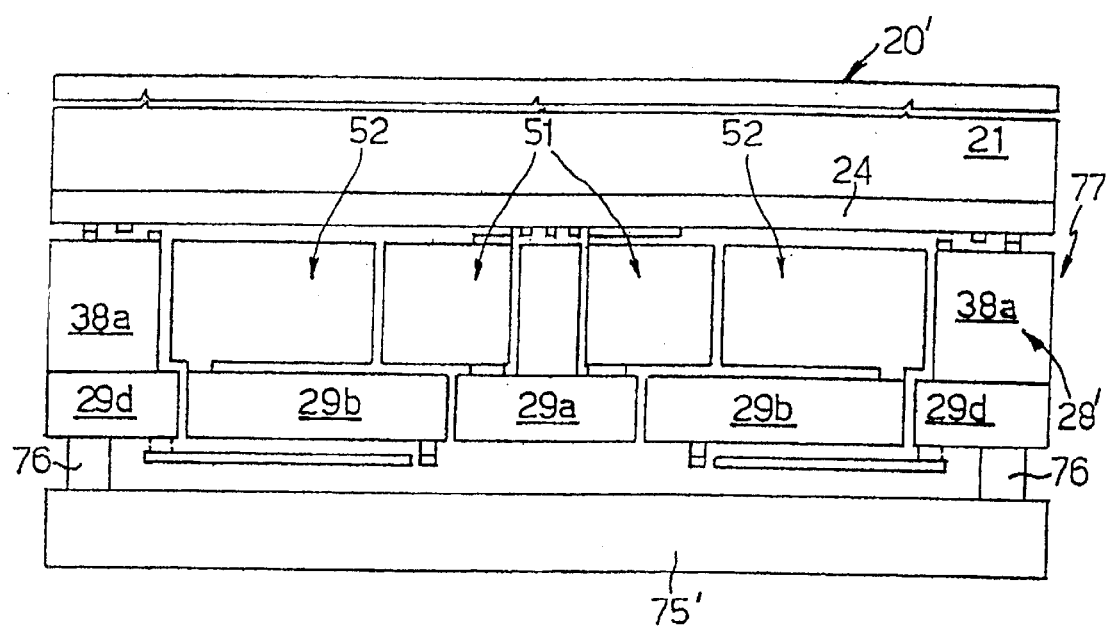
FIG. 21 shows a cross-section of a die obtained by cutting the composite wafer of FIG. 20.

Subsequently (FIG. 21), the composite wafer 78 is cut using ordinary cutting techniques. In this phase, the microactuator 10 is completely isolated and protected from the outside world, as explained above. Consequently, the suspended structures do not collapse due to the saw cooling water. A plurality of composite dice 77 is then obtained, each including a first die 20' and a second die 28' and being connected to a respective protection chip 75'. In this way, the composite dice 77 can be transported easily and with reduced risk of breakage. Alternatively, it is possible to separate the protective chip 75' by heating the composite dice 77 at a low temperature (200–260° C.), without damaging the components, and to transport the individual composite dice 77 on a traditional support using stick foil.

Figure 22:
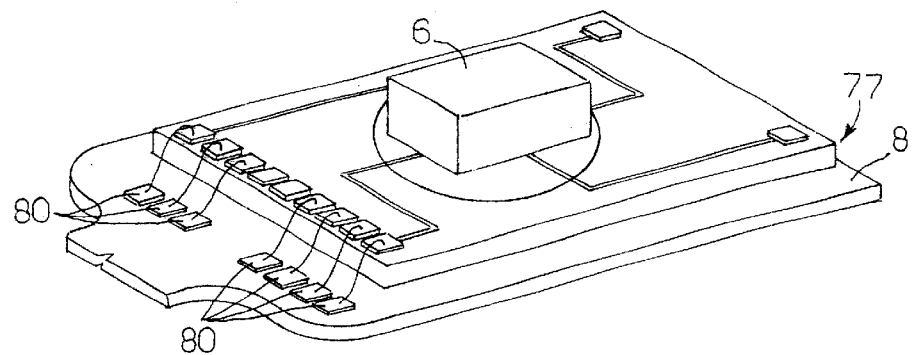
FIG. 22 shows a perspective view of the die of FIG. 21, after final assembly.

Finally (FIGS. 22 and 23), the final assembly steps are carried out, including gluing each composite die 77 on a respective gimbal 8, in a known way (and, in this step, the protection chip 75', if present, protects the composite die 77); removing the protection chip 75', if still present; gluing the slider 6 to the head-connection regions 64b; and wire-bonding the contact pads 64c to corresponding pads 80 provided on the gimbal 8.

Figure 23:
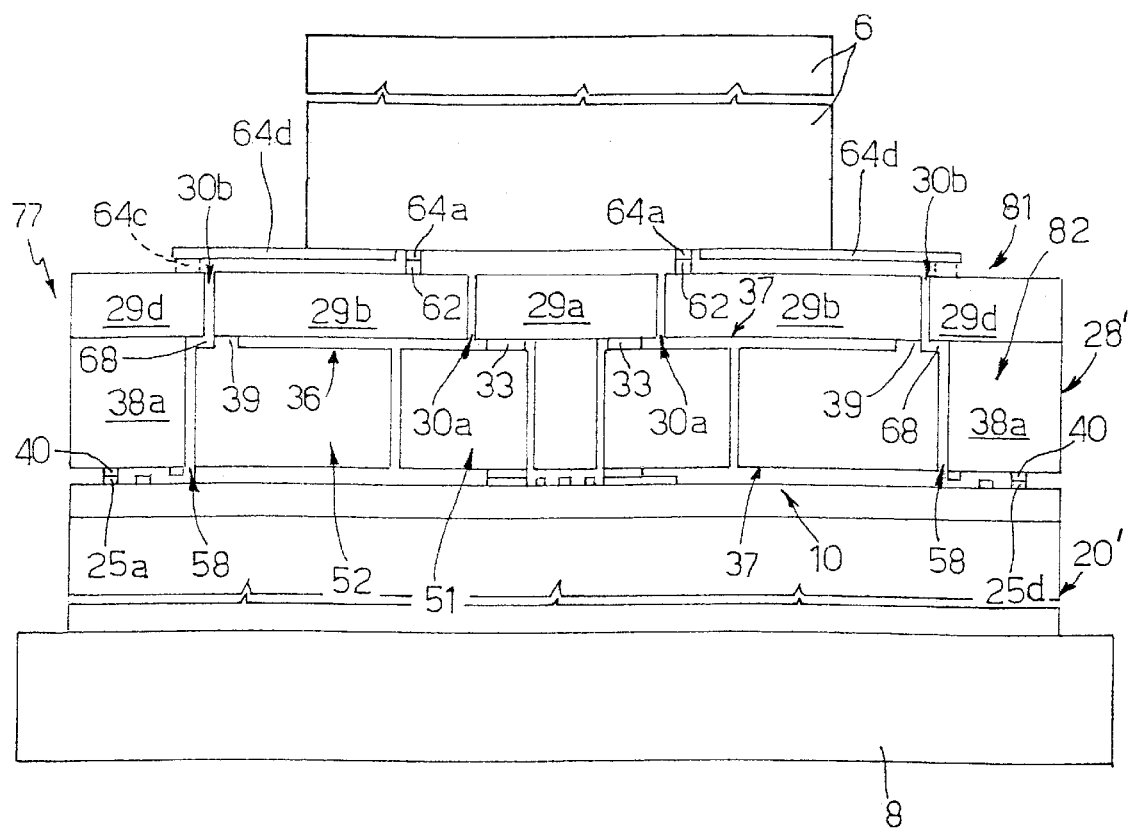
FIG. 23 shows a cross-section of the die of FIG. 22.

As may be seen in FIG. 23, the microactuator 10 has its rotor 52 and stator 51 formed in an operative portion of the second die 28' which is delimited by the first face 36 (arranged toward the first die 20' integrating the circuitry), by the second face 37, and by the fourth trench 58. The operative portion of the second die 28' is surrounded, on the second face 37 and on the side delimited by the fourth trench 58, by an encapsulation structure 81 formed by the central supporting region 29a, the annular supporting region 29b, and an external region 82 comprising part of the external portion 29d of the substrate 20 and part of the external portion 38a of the epitaxial layer 38. The stator 51 is supported by the central supporting region 29a through the stator insulating regions 33. The rotor 52 is supported both by the central supporting region 29a, through the third anchor portions 57, the movable anchoring sectors 55e and the spring elements 55d (in a manner not visible in the cross-section of FIG. 23), and by the annular supporting region 29b through the first rotor anchoring portions 39. In practice, the central supporting region 29a and the external region 82 of the encapsulation structure 81 are fixed, and the annular supporting region 29b is movable together with the rotor 52.

In the microactuator 10 of FIG. 23, the first trench 30a is isolated from the external environment by the metal annular region 64a which hermetically seals the gap between the slider 6 and the encapsulation structure 81, so preventing any external contamination both during fabrication and during operation of the hard-disk unit.

Any contamination through the second trench 30b is limited by the labyrinth conformation defined by the second trench 30b itself, by the labyrinth path 68 and by the fourth trench 58. In fact, any particles that may penetrate into the second trench 30b are forced to follow a tortuous path in which they can be entrapped before they reach the rotor 52.

Finally, the gimbal 8 is fixed to an arm 4 of the support body 3 in a per se known, not illustrated manner.

The advantages of the described process emerge clearly from the foregoing. In particular, it is emphasized that forming the microactuator 10 in a separate wafer, which is bonded upside down on the wafer accommodating the electronic components, allows the microactuator and the circuitry requiring an extreme lithographic process to be arranged closely, and the latter to be protected during assembly and cutting. In general, the described process enables assembling of any other micro-electromechanical actuation or sensing element that requires a lithographic process with different characteristics as the circuitry controlling and/or processing the signals supplied by the micro-electromechanical element, or when it is desirable to have a micro-electromechanical element formed in a separate wafer with respect to the electronic circuits that are connected to the micro-electromechanical element.

In addition, the microactuator 10 is protected both during fabrication, by the encapsulation structure 81, and during use, by the annular metal region 64a and the labyrinth structure formed by the second trench 30b, the fourth trench 58, and the labyrinth path 68, as explained previously.

Finally, it is clear that numerous variations and modifications may be made to the process and unit described and illustrated herein, all falling within the scope of the invention, as defined in the attached claims.

Figure 24:
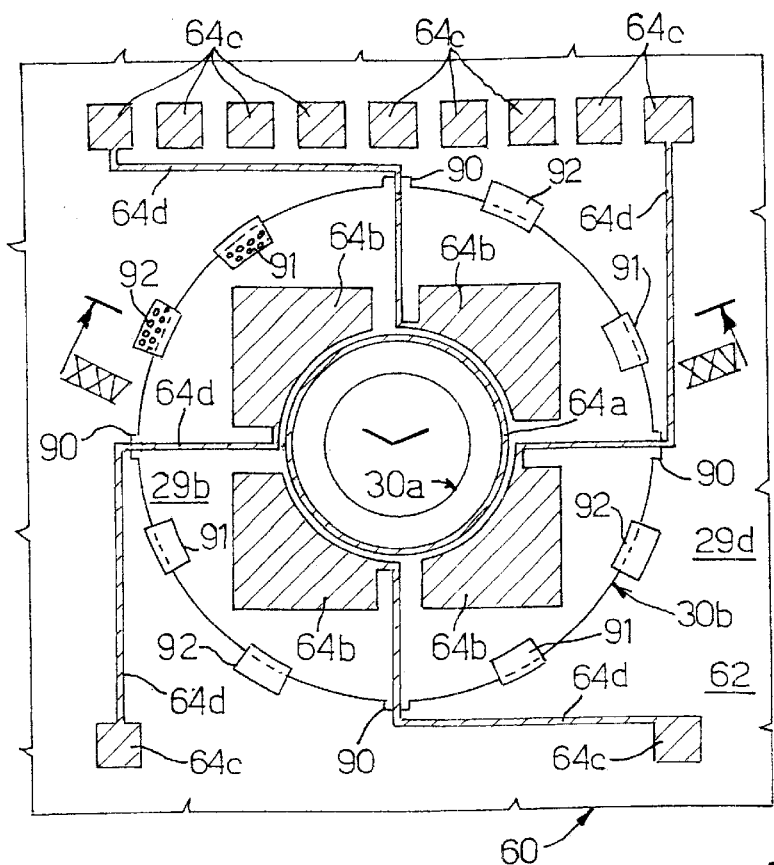
FIG. 24 shows a different embodiment of the microactuator in a top view similar to that of FIG. 19.
Figure 25:
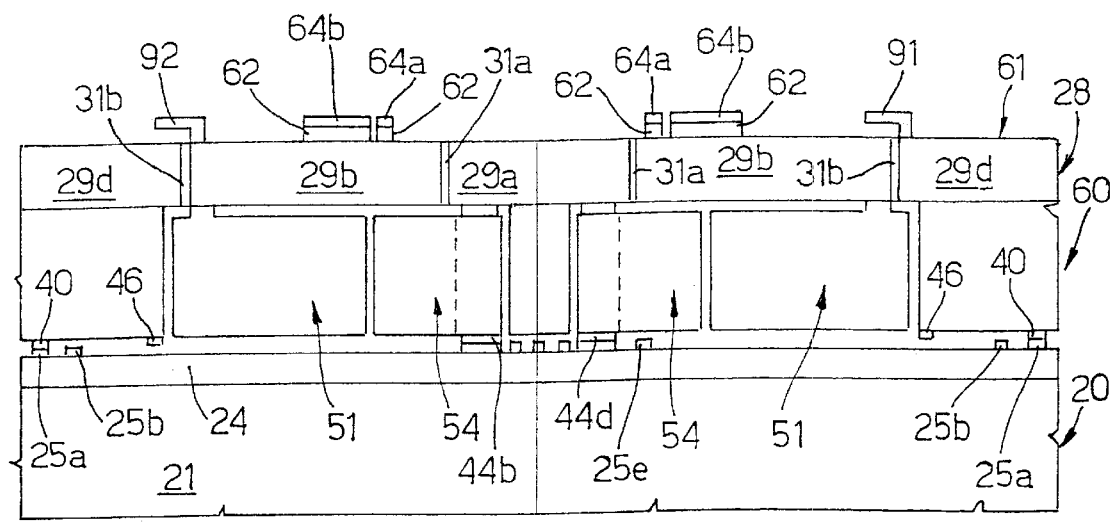
FIG. 25 shows a cross-section of the wafer of FIG. 24, taken along the cross-section line XXV—XXV.

For example, FIGS. 24 and 25 show a variation of the structure illustrated in FIGS. 18 and 19. In particular (see FIG. 24), the second trench 30b is not completely circular but is formed in such a way that the annular supporting region 29b has intrusions or teeth 90 extending in corresponding compartments of the outer portion 29d so as to form mechanical stops to the rotation of the outer portion 29d and possibly supply an end-of-travel signal.

In addition, stop elements 91, 92 are formed to limit the relative movements of the rotor 52 with respect to the fixed parts (stator 51, encapsulation structure 81), movements that are due to assembly operations or to inertial forces acting during operation of the microactuator 10. In detail, vertical stop elements 91, 92 are formed in the same way as the contact metal regions 64a–64d and are mutually interleaved. Specifically, the vertical stop elements 91 are anchored on the annular supporting region 29b and extend beyond the outer portion 29d; instead, the vertical stop elements 92 are anchored on the outer portion 29d and extend beyond the annular supporting region 29b. The portions of the vertical stop elements 91, 92 that extend in a cantilever way, respectively, above the outer portion 29d and above the annular supporting region 29b are preferably at least in part perforated to enable removal of the silicon-dioxide layer 62, as shown schematically only for a few of the vertical stop elements 91, 92.

By forming the stop elements 91, 92 with an unholed part protruding above the second trench 30b and adjacent to each other, a protective cage is obtained for the second trench 30b.

As an alternative to the drawings, the intrusions or teeth 90 and the vertical stop elements 92 may be arranged between the annular supporting region 29b and the cylindrical region 50.

Connection between the first and the second wafers 20, 28 may be formed also in a way different from what has been shown. For example, the connection and electric contact regions 25a–25e, 40, 44a–44d and the ring-shaped region 46 may be formed on only one of the two wafers, for example, on the first wafer 20, using a double metal-level process.

Finally, the movable anchoring sectors 55e may be joined to the cylindrical region 50, instead of being separated by the third trench 49, so that the rotor 52 is anchored also to the cylindrical region 50.

We claim:

1. A process for manufacturing a unit of at least two elements, comprising the steps of:
   forming a first wafer;
   forming micro-electromechanical structures in a surface portion of a second wafer of semiconductor material;
   attaching said second wafer to said first wafer, with said surface portion of the second wafer facing said first wafer;
   thinning said second wafer down to a first desired thickness;
   attaching said second wafer to a third wafer to obtain a composite wafer;
   cutting said composite wafer into a plurality of dice respectively fixed to a plurality of protection chips; and
   removing the protection chips.

2. The process according to claim 1, wherein said micro-electromechanical structures are microactuators, each comprising a rotor and a stator, and said first wafer is of semiconductor material and houses integrated electronic components forming a microactuator control circuit and a signal preamplification circuit.

3. The process according to claim 2, wherein after removing said protection chips, read/write transducers are attached to said dice and said dice are attached to supporting blocks for hard-disk drivers.

4. The process according to claim 2, wherein forming encapsulation structures for said micro-electromechanical structures.

5. The process according claim 1, wherein said step of forming microelectromechanical structures comprises the steps of:
   in a semiconductor substrate of the second wafer, forming first and second trenches delimiting a central supporting region, an intermediate supporting region, and an external supporting region;
   filling said first and second trenches with immobilization material;
   forming, on top of said semiconductor substrate, electric insulation regions and sacrificial regions;
   growing a semiconductor layer over said semiconductor substrate;
   defining stator regions and rotor regions in said semiconductor layer, said stator regions and rotor regions being separated laterally from each other and from an outer portion of said semiconductor layer by third and fourth trenches; and
   removing said sacrificial regions through said third and fourth trenches.

6. The process according to claim 5, wherein said step of thinning said second wafer comprises removing part of said semiconductor substrate as far as said first and second trenches, and after thinning said second wafer and before attaching said second wafer to a third wafer, said immobilization material is removed from said first and second trenches.

7. The process according to claim 5 wherein, after thinning said second wafer and before attaching said second wafer to a third wafer, metal contact regions are further formed on top of said semiconductor substrate.

8. The process according to claim 7, wherein said step of forming metal contact regions comprises forming a closed-shape sealing region surrounding said first trench, and after removing said protection chip, a third element is attached to said metal contact regions.

9. The process according to claim 7 wherein, simultaneously with said metal contact regions, vertical stop regions are formed that limit movements of said rotor with respect to said stator.

10. The process according to claim 1, wherein said step of attaching said second wafer to a third wafer comprises forming adhesive regions of removable material and having a closed shape on top of said semiconductor substrate, said adhesive regions surrounding at the top regions of said semiconductor substrate where said micro-electromechanical structures are formed.

11. The process according to claim 10, wherein said step of forming adhesive regions of removable material comprises the step of:
    forming a lead-tin layer on the third wafer; and
    defining said lead-tin layer.

12. The process according to claim 11, wherein said step of forming adhesive regions of removable material comprises the step of:
    forming a nickel layer on the third wafer before forming said lead-tin layer; and
    forming a double layer of chromium-gold on the top of said semiconductor substrate.

13. The process according to claim 10, wherein said removable material is removable with hot air jets arranged in front of sides of said third wafer.

14. The process according to claim 1, wherein said step of attaching said second wafer to a third wafer comprises forming adhesive regions of removable material.

15. The process according to claim 14, wherein said removable material is a gel.

16. The process according to claim 14, wherein said third wafer comprises protruding portions defining cavities, each cavity housing a respective microactuator and characterized in that said gel is deposited on said protruding portions and said cavities.

17. The process according to claim 1, wherein said step of attaching said second wafer to said first wafer comprises the steps of:
    forming at least first and second attachment regions on said first chip and, respectively, on said surface portion of said second wafer, said first and second attachment regions having a congruent shape, and said second attachment regions surrounding areas of said surface portions where said micro-electromechanical structures are formed; and
    attaching together said first and second attachment regions.

18. The process according to claim 17, wherein said first attachment regions are of electrically conductive material and are formed simultaneously with electric connection regions.

19. The process according to claim 1 wherein, after attaching said second wafer to a third wafer, said first wafer is thinned to a second desired thickness.

* * * * *